United States Patent [19]

Bayer

[11] Patent Number: 4,698,277
[45] Date of Patent: Oct. 6, 1987

[54] HIGH-TEMPERATURE LAMINATED INSULATING MEMBER

[75] Inventor: Eric W. Bayer, North East, Pa.

[73] Assignee: General Electric Company, Erie, Pa.

[21] Appl. No.: 929,461

[22] Filed: Nov. 12, 1986

[51] Int. Cl.⁴ .......................... B32B 3/00; B32B 3/30; B32B 7/02; B32B 9/00

[52] U.S. Cl. .................................. 428/141; 428/167; 428/213; 428/217; 428/220; 428/430; 428/446; 428/920

[58] Field of Search ............... 428/141, 167, 213, 215, 428/217, 220, 430, 446, 920

[56] References Cited

U.S. PATENT DOCUMENTS

| | | | |
|---|---|---|---|
| 2,801,189 | 7/1957 | Collier | 428/430 |
| 3,257,266 | 6/1966 | Sapper | 428/430 |
| 3,598,693 | 8/1971 | Andersen et al. | 428/443 |
| 3,859,153 | 1/1975 | Beyer et al. | 428/446 |
| 3,860,476 | 1/1975 | Moore, Jr. | 428/446 |
| 3,861,947 | 1/1975 | Hamling | 428/446 |
| 4,041,199 | 8/1977 | Cartwright | 428/446 |
| 4,076,788 | 2/1978 | Ditto | 264/255 |
| 4,100,526 | 6/1978 | Kirilloff et al. | 338/279 |
| 4,292,364 | 9/1981 | Wesch et al. | 428/286 |
| 4,316,172 | 2/1982 | Luy | 338/230 |
| 4,375,493 | 3/1983 | George et al. | 428/920 |
| 4,392,335 | 7/1983 | Heiman | 428/446 |
| 4,605,588 | 8/1986 | Simpson et al. | 428/288 |

FOREIGN PATENT DOCUMENTS 2151544 7/1985 United Kingdom .

Primary Examiner—William J. Van Balen
Attorney, Agent, or Firm—Albert S. Richardson, Jr.

[57] ABSTRACT

An asbestos-free, unitary insulating member comprises two juxtaposed layers: a first layer of refractory material, and a thicker layer of thermoset resin filled with glass fibers. The first layer was fully cured separate from the second layer, and its inboard side has a relatively coarse surface. The two layers were joined to one another concurrently with the resin in the second layer being cured under pressure in a heated mold, whereby some of the resin penetrates the interstices of the coarse surface of the first layer to form a strong interlayer bond.

13 Claims, 5 Drawing Figures

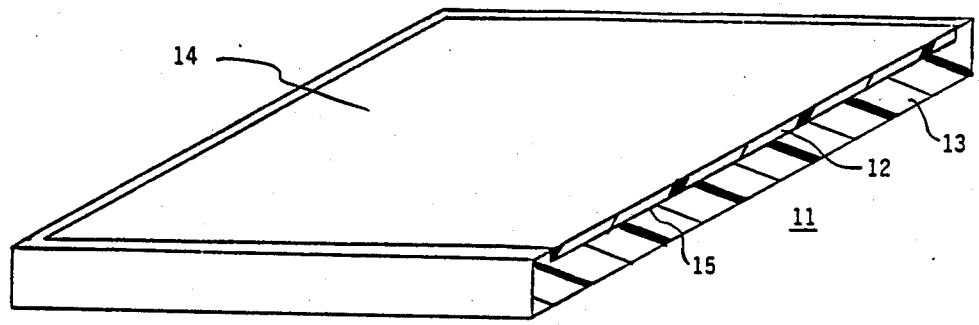
FIG. 1
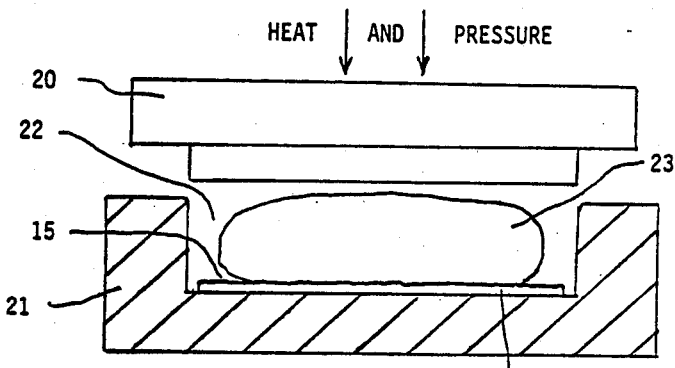
FIG. 2
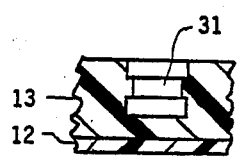
FIG. 3
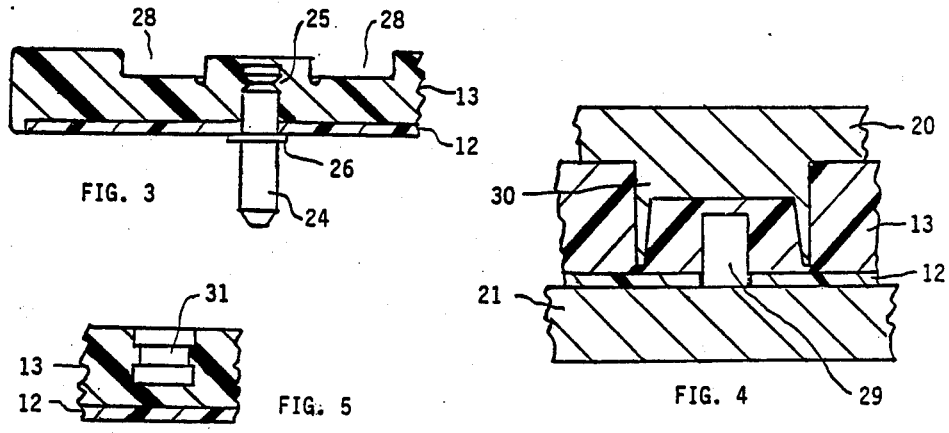
FIG. 4
FIG. 5

HIGH-TEMPERATURE LAMINATED INSULATING MEMBER

BACKGROUND OF THE INVENTION

This invention relates to composite material suitable for physically supporting and electrically insulating bare electrical conductors, and it relates more particularly to a laminated member characterized by sufficiently high thermal rating to be substitutable for an asbestos board.

In recent years persons skilled in the art of electrical insulation have been searching for substitutes for asbestos. For example, U.S. Pat. No. 4,316,172 discloses an asbestos-free frame for a ribbon-like current conducting element that is used in the dynamic braking or retarding function of electric traction motors on railroad locomotives. During dynamic braking of a locomotive, its traction motors operate in a generating mode and supply current to resistor grids where the electrical energy is converted to heat and dissipated to the atmosphere with the aid of an associated cooling fan. According to the above-cited patent, the frame of the dynamic braking resistor grid can be made of insulator blocks formed of a hot-molded organic material. However, such material does not have a good a thermal rating as asbestos, and therefore the hot current-conducting element of the grid needs to be spaced from the insulator blocks by appropriate support clips. Even so, the frame can be damaged or, in the worst case, ignited if the element overheats and melts down due to a malfunction that causes persistent overcurrent or a blockage of cooling air. For this reason the prior art hot-molded organic material is not per se desirable for such frames.

Refractory material such as alumina silicate has a good fire retardant characteristic but not the required flexural strength for a successful dynamic braking resistor grid frame. It has been suggested that a thin layer or sheath of such material can be used as a coating on glass fiber cloth, thereby forming a composite liner that can be attached, by means of glue or cement, to the surface of a panel or duct where it serves as a fire barrier. See British patent application 2,151,544A published July 24, 1985. To provide greater physical strength and to eliminate the separate lyer of adhesive, this British application teaches a method of bonding the alumina silicate-coated glass fiber cloth directly to a base layer of epoxy resin-impregnated non-metallic fibers to form a rigid 3-layer laminate suitable for use as the exhaust duct of a gas turbine engine.

In the art of making electrical bushings, wherein a metal stud is coated with adhesive material and encircled by a molded polyester body, it has heretofore been suggested that the bonding and fluid-sealing effects of the adhesive layer between the stud and its surrounding insulator would be enhanced if the stud were etched, scored, shot-blasted, grooved, or knurled to create irregularities in its surface.

SUMMARY OF THE INVENTION

The objective of the present invention is to provide an asbestos-free, rigid, unitary article of manufacture that has all of the characteristics needed to be useful as an insulator and support member in the frame of a dynamic braking resistor grid and that is relatively simple and inexpensive to make.

In one form of the invention, a laminated board-like member comprises a relatively thin first layer inlaid into a surface of another thicker layer. The first layer is a hard refractory material that was fully cured before being joined to the second layer, and the inboard side of the first layer has a relatively coarse surface. The other layer is a molded compound comprising asbestos-free, electrically non-conductive fibrous material impregnated with a thermoset resin that was cured under pressure in a mold while superimposed directly on the inboard side of the first layer so that some of the resin penetrates the interstices of the coarse surface to form an interlayer bond that will remain physically stable as the temperature at the outboard side of the first layer varies overrf a wide range (e.g., −50 to +600 degrees Celsius). Consequently the member is a rigid, unitary laminate suitable for use as an electrical insulator and physical support in high-temperature applications. Its dielectric strength and flame retardant characteristics are as good as or better than asbestos board, and its flexural strength is appreciably higher.

The present invention will be better understood and its various subjectives and advantages will be more fully appreciated from the following description taken in conjunction with the accompanying drawing.

BRIEF DESCRIPTION OF THE DRAWING

FIG. 1 illustrates a rigid board or panel constructed in accordance with the present invention;

FIG. 2 is a simplified schematic view, partly in section, of the basic parts of a compression mold in which a laminated insulating member embodying the present invention can be made;

FIG. 3 is a cross-sectional view of a preferred embodiment of the insulating member showing a region thereof in which a metal pin is anchored;

FIG. 4 is a cross-sectional view of part of the insulating member in a region of the mold arranged to form a blind hole therein; and FIG. 5 is a cross-sectional view of a part of the insulating member in which a metal insert has been molded.

DETAILED DESCRIPTION OF THE INVENTION

FIG. 1 is a perspective view, partly in section, of an asbestos-free, rigid, unitary laminated member 11 illustrating the present invention in its simplest form. The member 11 is characterized by relatively high dielectric and flexural strength, and it is suitable for use as an electrical insulator and physical support in high-temperature applications. It has a first layer 12 inlaid into a surface of a parallel second layer 13. Preferably the area of the first layer is slightly smaller than that of the second layer. Typically the overall dimensions are approximately: 21 inches long, four inches wide, and from one-half to one inch thick. In practice the member 11 will be so disposed that its second layer 13 is mounted on or attached to a metal support (not shown) with the outboard side of the first layer 12 being exposed to a source of heat (e.g., the current conducting element of a dynamic braking resistor grid) that can raise the temperature at the outboard side to 480 degrees Celsius for extended periods of time.

The first layer 12 of the member 11 is a piece of hard, impervious refractory material that was fully cured, i.e., formed into its finished shape and hardness, separate from the second layer 13. The outboard side of this piece has a smooth, flat, non-absorbent surface 14, but the inboard side has a relatively coarse surface 15 which preferably is formed simply by omitting the final surface-finishing step on one side of the piece in the process of its manufacture. Refractory material is inorganic, non-flammable, and a poor conductor of heat.

Material well suited for the refractory layer 12 is known as "Zircar Type 100" and can be purchased from Zircar Products, Inc., 110 N. Main Street, Florida, NY 10921. Zircar Type 100 refractory sheets are made from an alumina-silica base material (e.g., 75% alumina, 16% silica, 9% other metal oxides) having the required high thermal rating. More specifically, such material will remain chemically and mechanically stable when subjected continuously to a temperature higher than 600 degrees Celsius. It has the low thermal conductivity, the high arc resistance, and the fire retardant characteristic of asbestos without containing any asbestos.

The second layer 13 of the member 11 is a molded compound having substantially higher flexural strength and much better dielectric properties than the first layer. It comprises electrically non-conductive fibrous material impregnated with a thermoset resin that was cured after the compound was placed under pressure in a heated mold in direct contact with the inboard side of the first layer 12 so that some of the resin penetrates the interstices of the coarse, relatively porous surface 15 to form a strong interlayer bond that will remain physically stable as the temperature at the outboard side of the layer 12 varies over a wide range. Non-asbestos, inert, inorganic fillers are used in the compound from which the layer 13 is made. A thermosetting molding compound comprising glass fiber-filled polyester resin has been developed for this purpose. The proportion of glass and the composition of the resin and other ingredients in the mixture are so selected that the molded layer 13 is characterized by relatively high dielectric and flexural strength, good impact capability, and a low shrink factor. By way of example, it has approximately four times the flexural strength and more than six times the dielectric strength as the refractory layer 12. At elevated temperatures the layer 13 will remain virtually non-flammable, will not emit objectionable smoke, and will retain the required strength (e.g., at least 12,000 pounds per square inch after 300 hours at 225 degrees Celsius). While this layer has a thermal rating (e.g. 225° C.) lower than the required thermal rating of the refractory layer 12, it is insulated from the source of heat by the intervening layer 12 and therefore does not get as hot. To avoid undesirably high delaminating stress during thermal cycling of the composite member 11, the two layers 12 and 13 should have closely matching coefficients of thermal expansion, within approximately 10% of each other.

The relative thickness of the layers 12 and 13 is a function of at least three variables: thermal conductivity, dielectric strength, and cost of materials. Assuming that the refractory material used for the first layer 12 is more expensive than the molding compound used for the second layer 13, as will often be true, it is desirable to make layer 12 much thinner than layer 13 and just thick enough to provide the required thermal gradient between its relatively hot and cool surfaces 14 and 15, respectively. In the illustrated embodiment of the invention, the mean thickness of the Zircar layer 12 is on the order of 0.1 inch which can be obtained, if desired, by laminating two thinner sheets of material. In any event, to ensure adequate thermal insulation this layer will not be less than 30 mils thick. Since the first layer is relatively thin, the second layer 13 will need to be thick enough to provide most of the required dielectric and flexural strength of the member 11 but not so thick as to prevent the efficient transfer of heat from the inboard to outboard sides of this layer. In the illustrated embodiment, the layer 13 has a minimum thickness of approximately 0.4 inch to ensure adequate flexural strength of the composite member 11.

The presently preferred method of making the laminated member 11 is illustrated in FIG. 2 where reference numbers 20 and 21 designate the upper and lower halves, respectively, of a matched die compression mold. The preformed refractory layer 12 is centered in the cavity 22 of the lower half 21 of the mold, with its rough surface 15 facing upwardly, and a charge 23 of uncured molding compound is placed on top of the layer 12 in intimate contact with surface 15. The size of the charge 23 is just large enough and its viscosity is sufficiently low to ensure that the compound will flow around the edges of the refractory layer 12 and fill all available space between the two halves of the mold after the top half 20 is closed and pressure is applied and before the resin is cured. A polyester resin molding compound containing approximately 20 percent by weight of loose glass fibers has proven to have sufficient "flowability" while meeting minimum strength requirements. Preferably the compound also contains suitable additives to enhance its wetting ability and to prevent the resin from curing too fast.

In practice it is usually desirable to use a mold-release substance (not shown) between the layer 12 and the bottom of the cavity 22 and to preheat both the layer 12 and the two halves of the mold before closing the top half 20. Persons skilled in the art will understand that an injection molding technique could be used instead of compression molding. In either case, once the mold is closed with the refractory layer 12 and the charge 23 in place, enough pressure and heat are applied to the nesting mold halves for a sufficient period of time to cure the resin in the compound 23. Typical parameters of the molding process are 350 psi, 160° C., and 12 minutes.

After the compound has solidified in the desired shape of layer 13 and the hardened resin tightly binds this layer to the adjoining layer 12, pressure is released, the mold is cooled, and the molded article is removed for further cooling to ambient temperature. To ensure that the finished article does not have an undesirable bow due to its two layers contracting or shrinking at different rates while cooling, it is desirable to provide a slight counter-bow at the bottom of the cavity 22 and/or to counter-bend the member 11 while it is cooling.

Because the preformed refractory layer 12 is hard and virtually impervious, the resin in the charge 23 cannot significantly permeate or migrate inside this layer during the above-described molding process. Consequently the resin will be shielded by the layer 12 from the heat source to which the outboard surface 14 of the layer 12 is exposed when the finished member 11 is being used in its intended high-temperature application (such as the frame of a dynamic braking resistor grid). This means that the resin does not have to have as high a thermal rating as is required of the refractory layer 12, and therefore a less costly resin can be used. Nevertheless, because of the coarse surface 15 on the layer 12, a reasonably strong bond is formed between the two layers 12 and 13, and the refractory layer will not delaminate under normal temperature excursions and use.

Although not shown in FIG. 2, in practice the lower half 21 of the mold can have a number of holes at predetermined locations, and a plurality of upstanding metal members (e.g., studs, clips or pins) can be removably loaded in such holes. To accommodate these members, corresponding holes are drilled, punched, or otherwise formed in the refractory layer 12 before it is placed in the mold cavity 22. During the molding process, the parts of the members that are exposed in the cavity 22 are enveloped by the compound 23 which flows into notches or grooves near their upper ends. Consequently, the upstanding members are firmly anchored in the layer 13 once cured. By way of example, a cylindrical pin is shown at 24 in FIG. 3, and reference No. 25 designates its annular groove. The main purpose of such upstanding members is to support the resistor element of a dynamic braking resistor grid. The members are also useful for locating or centering the layer 12 in the mold cavity 22 which is longer and wider than this layer. In addition, these members help to assure a good bond at the interface of the two layers 12 and 13 by keeping pressure on the refractory layer 12, which is captured between the adjoining layer 13 and an abutting flange 26 on each member, after the mold pressure is relieved near the end of the curing cycle.

FIG. 3 also illustrates valleys or troughs 28 that can advantageously be formed in the outboard side of the molded layer 13 to save material and weight in regions where a thicker layer is not needed to meet the flexural strength or electrical insulating requirements of the member 11. In addition, the thinner web of material at the bottom of each trough and the extra surface area at the sides will both encourage the flow of heat through the member 11.

If and where desired, both through and "blind" openings can also be molded into the layer 13 of the member 11. A blind opening is illustrated in FIG. 4 where a suitably configured protrusion 29 is shown projecting from the lower half 21 of the mold through an aperture in the layer 12 and into the molded layer 13. The protrusion 29 will leave a void or opening of the same configuration in the layer 13 once cured. If egress were desired for a metal conductor that serves as an electrical tap from the resistor element of a dynamic braking grid, a larger through hole could be formed in the vicinity of the blind opening by punching out the web of the finished member 11 in this area. For the latter purpose, it is desirable to have a relatively thin section of molded material around the selected opening in the layer 13, and this is practically accomplished by providing in the upper half 20 of the mold a downwardly protruding boss of appropriate configuration. One such boss is shown at 30 in FIG. 4.

It may also be advantageous to provide internally tapped metal inserts in the molded layer 13 for receiving threaded fasteners that can be used to attach the outboard side of layer 13 to a reinforcing member or to an external support. One such insert is shown at 31 in FIG. 5. It has a pair of rectangular shoulders. Such inserts can be releasably suspended at predetermined locations of the upper half 20 of the mold for convenient installation during the molding process.

While preferred embodiments of the invention and of the manner of making and using it have been described, various other embodiments and modifications will be apparent to persons skilled in the art. For example, the same mold that is used for curing the second layer 13 of the member 11 and for concurrently joining it to the preformed refractory layer 12 could also be used, in a separate, higher-temperature process, for curing the refractory layer. The concluding claims are therefore intended to cover all such modifications as fall within the true spirit and scope of the invention.

What is claimed is:

1. An asbestos-free, rigid, unitary, laminated member characterized by relatively high dielectric and flexural strength and suitable for use as an electric insulator and physical support in high-temperature applications, the member having a first layer joined on one side to a second layer, wherein:
   a. said first layer is a hard refractory material that was fully cured separate from said second layer, the inboard side of said first layer having a relatively coarse surface and the mean thickness of said first layer exceeding approximately 30 mils; and
   b. said second layer is a molded compound comprising electrically non-conductive fibrous material impregnated with a thermoset resin that was cured after the compound was placed under pressure in a heated mold in direct contact with said inboard side of said first layer so that said resin penetrates the interstices of said coarse surface to form an interlayer bond that will remain physically stable as the temperature at the outboard side of said first layer varies over a wide range.

2. A laminated member as in claim 1, in which said first layer is thinner than said second layer.

3. A laminated member as in claim 2, in which said first layer is inlaid into a surface of said second layer.

4. A laminated member as in claim 1, in which said refractory material comprises alumina silicate.

5. A laminated member as in claim 1, in which said fibrous material is glass.

6. A laminated member as in claim 1, in which said resin is a polyester resin.

7. A laminated member as in claim 6, in which said fibrous material is glass.

8. A laminated member as in claim 7, is which said refractory material comprises alumina silicate.

9. A laminated member as in claim 1, in which the outboard side of said first layer is flat.

10. A laminated member as in claim 1, further characterized by chemical and mechanical stability when the outboard side of said first layer is exposed to a temperature as high as 600 degrees Celsius.

11. A laminated member as in claim 1, is which said second layer has regions of reduced thickness defining troughs in its outboard side.

12. A laminated member as in claim 1, in which metal upstanding members are anchored in said second layer, said members extending through said first layer and protruding from the outboard side thereof.

13. A laminated member as in claim 12, in which each of said members has a flange abutting the outboard side of said first layer.

* * * * *